United States Patent [19]

August

[11] 3,913,323

[45] Oct. 21, 1975

[54] DEVICE FOR TREATMENT OF EXHAUST GASES FROM AN INTERNAL COMBUSTION ENGINE

[76] Inventor: Paul August, C/Capellades 1, Barcelona 6, Spain

[22] Filed: Mar. 22, 1973

[21] Appl. No.: 343,719

[52] U.S. Cl. .......... 60/288; 23/288 FA; 23/288 FB; 60/294; 60/301
[51] Int. Cl.² ........................ F01N 3/14; F01N 3/16
[58] Field of Search ............. 60/274, 301, 288, 299, 60/294; 23/288 F, 277 C, 288 FA, 288 FB

[56] References Cited
UNITED STATES PATENTS

| | | | |
|---|---|---|---|
| 3,109,715 | 11/1963 | Johnson | 60/299 |
| 3,186,511 | 6/1965 | Kliewer | 60/319 |
| 3,201,206 | 8/1965 | Wawrziniok | 60/288 |
| 3,503,714 | 3/1970 | Lang | 60/288 |
| 3,637,344 | 1/1971 | Thompson | 60/301 |
| 3,740,197 | 6/1973 | Scheitlin | 60/301 |
| 3,757,521 | 9/1973 | Tourtellotte | 60/301 |
| 3,773,894 | 11/1973 | Bernstein | 60/301 |
| 3,775,064 | 11/1973 | Berger | 60/301 |
| 3,826,089 | 7/1974 | Nakajima | 60/306 |

FOREIGN PATENTS OR APPLICATIONS 1,946,862   4/1971   Germany ............................. 60/288

Primary Examiner—Douglas Hart
Attorney, Agent, or Firm—Albert L. Jeffers; Roger M. Rickert

[57] ABSTRACT

A device for the treatment of exhaust gases from an internal combustion engine in which the exhaust gas is passed through a first bed of catalytic material which reduces nitrous oxides and is then supplied to a main flow channel which takes the form of a thermal reactor and which is surrounded by a bed of catalytic material in which carbon monoxide and hydrocarbon are oxidized. A control valve in the main flow channel is adjustable to control the share of the gas leaving the first bed of catalytic material which passes through the second bed of catalytic material. Additional air is supplied to the stream of exhaust gases, especially in the region immediately downstream of the first bed of catalytic material.

11 Claims, 1 Drawing Figure

U.S. Patent  Oct. 21, 1975  3,913,323
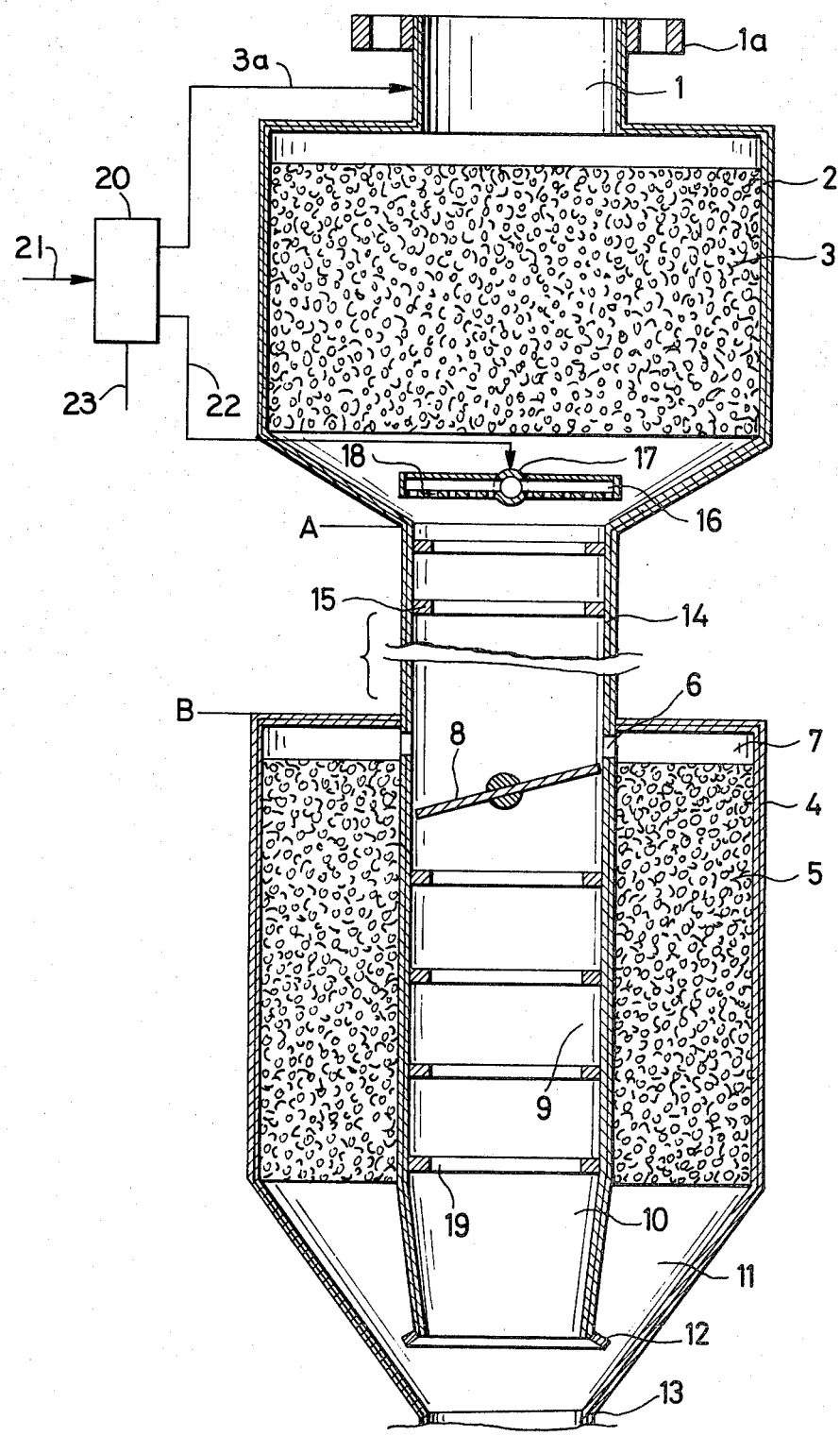

DEVICE FOR TREATMENT OF EXHAUST GASES FROM AN INTERNAL COMBUSTION ENGINE

The present invention relates to a device for the treatment, especially by after combustion, of the exhaust gases leaving an internal combustion engine, and is particularly concerned with such a device in which exhaust gases are exposed to two serially arranged beds of catalytic material.

The treatment of exhaust gases from internal combustion engines by passing the exhaust gases while still hot through beds of catalytic material is known, and the present invention represents improvements in this general type of exhaust gas treatment device.

An object of the present invention is the provision of a device for the treatment of exhaust gases from an internal combustion engine which produces superior results.

Another object is the provision of a device of the nature referred to which operates efficiently under all conditions.

A still further object is the provision of a device of the nature referred to which can easily be installed in an engine arrangement.

A still further object is the provision of a device of the nature referred to in which the treatment of the exhaust gases occurs earlier than in heretofore known devices and wherein the treatment takes place more efficiently than has heretofore been possible.

BRIEF SUMMARY OF THE INVENTION

According to the present invention, an exhaust gas treatment device according to the present invention is arranged to be connected directly to the exhaust manifold of the engine and is constructed as a thermal reactor connected in heat exchange relation with at least one catalyst bed to be heated thereby.

When the engine is running under light load, or is idling, the exhaust gases pass substantially in their entirety through the beds of catalysts, whereas under greater load of the engine, a portion of the exhaust gases flows through a main channel with only a portion of the exhaust gases passing through at least one of the catalyst beds.

The main flow channel through which the gases flow when bypassing the catalyst bed heats up quickly after cold starting of the engine so that after the engine comes up to load and exhaust gases commence to bypass along the main channel it will already be heated to a proper temperature.

Heretofore, two catalyst chambers were arranged in surrounding relation to the main flow channel, but it has been discovered that if the catalyst chambers are axially spaced with an intervening connection piece which mixes gases flowing therethrough improved results will be obtained. The connection piece referred to is preferably as large in diameter as the discharge end of the exhaust manifold and preferably has a length of at least 20 centimeters. The connection piece advantageously is provided with mixing elements therein which may be in the form of rings mounted on the inside wall of the connection piece.

It has been found advantageous to arrange the first catalyst bed which serves for the reduction of nitrous oxide in the leading position and so arranged that all of the exhaust gases pass therethrough. In this catalyst bed, the temperatures never become so high that the catalyst material will be destroyed so that the necessity of bypassing gases around this first catalyst bed does not exist. The omission of the central passage through the first bed of catalyst provides more space for catalytic material in the same space than was heretofore possible.

It is known to supply additional air during cold starting ahead of the first bed of catalyst, but once the engine is warm, the air can be added to the stream of the exhaust gases behind the first bed of catalyst. According to the present invention, it is suggested to change the supply of air from in front of the first bed of catalyst to behind the said bed gradually or in steps.

It is suggested that in all load ranges of the engine a small stream of air be blown in either ahead or behind the first bed of catalyst, and it is also possible when effecting a cold start of the engine to introduce a small stream of air behind the first bed of catalyst. Even after the main supply of addition air has been switched to the region behind the first catalyst, it is of benefit to supply a small stream of addition air ahead of the first bed of catalyst.

By switching the added air supply in the described manner, the second bed of catalyst; and which is provided for effecting the oxidation of carbon monoxide and hydrocarbons; is steadily heated up and thereby becomes active more quickly than if the supply of added air were quickly switched from ahead of the first bed of catalyst to behind the first bed of catalyst.

The supply of a small stream of combustion air behind the first catalyst under cold starting conditions promotes, as has been found out by experimentation, a rapid starting of the after combustion carried out in the device.

DETAILED DESCRIPTION OF THE INVENTION:

Referring to the drawings somewhat in detail, the device shown in the drawings comprises a flange 1a for direct connection to the exhaust manifold of the engine. The device comprises a first inlet channel 1 which connects the engine exhaust manifold with the first catalytic chamber 2 which contains a catalyst 3 for the reduction of nitrous oxide (NO). At the discharge end, chamber 2 tapers inwardly to a discharge opening which is about the same diameter as pipe or channel 1.

Following chamber 2 is a chamber 4 but, in contrast to known devices, there is inserted between chambers 2 and 4 a connection piece or pipe nipple 14. Chamber 4 is an annular bed of catalytic material serving for the oxidation of carbon monoxide and hydrocarbons. Nipple or connection piece 14, as mentioned, is preferably about 20 centimeters long and can be even longer.

To the end of connection piece 14 adjacent chamber 4, there is connected a main gas channel member which extends completely through the bed of catalyst 5 in chamber 4. Near the inlet end of channel member 9 is a control valve 8, which may be a butterfly type control valve, while at the discharge end, channel member 9 has an inwardly tapering portion 10.

The chamber 4 in the region thereof surrounding tapered portion 10 of channel member 9 also tapers inwardly to be connected with exhaust pipe 13. At the extreme exit end of portion 10 of channel member 9, there is an outwardly flared ring 12 which serves for creating turbulence in the gases leaving catalytic material 5 thereby promoting intimate mixture of the gases which flow into exhaust pipe 13.

The channel member 9 serves as a thermal reactor and to this end contains annular members 19 which serve as mixing elements and which also conduct heat.

Additional combustion air can be introduced ahead of the bed of catalytic material 3 as by way of a connection shown at 3a. The supply of air via connection 3a may be controlled as a function of the setting of a carburetor, which is to say, the setting of the throttle valve of the carburetor of the pertaining engine.

In the drawings, an arrangement is disclosed for supplying air behind the bed of catalytic material 3 in the form of a pipe 17 which is connected to one or more pipes 16 with pipes 16 having ports 18 on the downstream side thereof. The pipes 16 and ports 18 therein distribute the air over the cross section of the channel member 9.

The exhaust gases flowing through connection piece 14 will, when restricted by valve 8, flow radially outwardly through ports 6 into space 7 at the upstream end of the bed of catalyst 5. When the engine is lightly loaded, valve 8 is substantially closed, but when the engine is more heavily loaded or when the engine becomes hot, valve 8 will move toward open position, whereby a smaller share of the exhaust gases will flow through the bed of catalyst 5.

The two gas streams, namely, the gas stream flowing through channel member 9 and becoming heated and admixed by rings 19 joins the gas flowing through the bed of catalytic material 5 downstream from turbulence creating ring 12 and immediately upstream from the inlet end of exhaust pipe 13.

Control valve 8 is arranged to open when channel member 9 and rings 19 are sufficiently heated and at which time the bed of catalytic material 5 will be at a temperature of from about 500° to 600°C. At this time, the vehicle is operating at a speed of from about 60 to about 90 kilometers per hour.

Safety devices could be provided for causing valve 8 to open in case the catalytic material 5 exceeds a predetermined maximum allowable temperature.

It has been mentioned that the supply of extra air is controlled, and this may be effected by a controller 20 having air supplied thereto by conduit 21 and discharging air to the connection at 3a upstream from the bed of first catalytic material and a connection 22 leading to pipe 17. A control member 23 is provided for controlling the division of the air between connections 3a and 22.

It is important, during idling and light engine loads, particularly while the engine is cool, to make certain that not too much added air is supplied because this would cool the engine exhaust gases and delay the time at which the catalytic material 5 becomes fully operative.

Thus, it is advantageous to control control member 23 by connecting it to the throttle of the engine. Other devices for controlling the supply of air and for dividing it between the two connections will suggest themselves.

Preferably, when the air supply to either side of the first bed of catalyst 3 is at a maximum, there is at least a small supply of air to the other side of the bed.

The entire outer side of the device according to the present invention is preferably provided with heat insulation and especially for the connection piece 14 in chamber 4 are provided with efficient heat insulation.

The unit according to the present invention is easily installed on an engine particularly because the two catalytic chambers are separated from each other and, additionally, the advantage exists that the oxidation occurring in the body of catalytic material at 5 occurs earlier and more efficiently than has heretofore been possible.

Modifications may be made within the scope of the appended claims.

What is claimed is:

1. A device for the treatment of internal combustion exhaust gases comprising:
   a first chamber having an upstream end and a downstream end and containing catalytic material for the reduction of nitrous oxide through which all of the exhaust gases flow;
   a main flow channel member having an upstream end and a downstream end;
   a second catalyst containing chamber surrounding said main flow channel member having a plurality of ports communicating therewith and a downstream outlet remote from said ports;
   a connection piece in the form of a pipe having one end connected to the downstream end of said first chamber and the other end connected to the upstream end of said channel member;
   a plurality of mixing devices mounted on the inside wall of the connection piece pipe for admixing gases passing through the pipe;
   first means for supplying air to the exhaust gases near the upstream end of the connection piece pipe including at least one pipe extending transversely to said connection piece pipe for a distance at least as great as the diameter of the connection piece pipe, ports in the downstream side of the at least one pipe, and means for supplying air to the at least one pipe; and
   a butterfly type control valve in said main flow channel member with the plurality of ports in the main flow channel member disposed between the control valve and the channel member upstream end for distributing the flow of exhaust gases between the main flow channel member and the second catalyst containing chamber in percentages in accordance with particular control valve positions.

2. A device according to claim 1 in which said connection piece is a pipe as large in diameter as the inlet end of said first chamber.

3. A device according to claim 1 in which said connection piece is at least about 20 centimeters long.

4. A device according to claim 1 in which said first chamber has an inlet member adapted for connection to an engine manifold and an outlet member connected to said connection piece and has the entire transverse inside area thereof filled with catalytic material.

5. A device according to claim 1 which includes second means for supplying air to the upstream end of said first chamber.

6. A device according to claim 5 which includes control means for controlling the supply of air to said first and second means and operable for reducing the supply of air to said first means while simultaneously increasing the supply of air to said second means and vice versa.

7. A device according to claim 6 in which said control means provide for a predetermined minimum supply of air to said first means when the supply of air to said second means is at a maximum.

8. A device according to claim 6 in which said control means provide for a predetermined minimum supply of air to said second means when the supply of air to said first means is at a maximum.

9. A device according to claim 1 which includes means under the control of the throttle of the engine for controlling the supply of air to said first means.

10. A device according to claim 1 which includes turbulence creating and heat exchange elements on the inside wall of said channel member, the outside wall of said channel member forming the radially inner wall of said second chamber.

11. A device according to claim 1 in which the downstream end of said channel member and the downstream end of said second chamber are substantially coextensive and taper inwardly, the downstream end of said second chamber being connected to an exhaust pipe.

* * * * *